(12) United States Patent
Santoso et al.

(10) Patent No.: US 10,015,281 B2
(45) Date of Patent: Jul. 3, 2018

(54) WIRELESS SOFTWARE LOADER

(71) Applicant: The Boeing Company, Chicago, IL (US)

(72) Inventors: Robert B. Santoso, Anaheim, CA (US); Andrew J. Meredith, Venice, CA (US)

(73) Assignee: The Boeing Company, Chicago, IL (US)

( * ) Notice: Subject to any disclaimer, the term of this patent is extended or adjusted under 35 U.S.C. 154(b) by 295 days.

(21) Appl. No.: 14/792,391

(22) Filed: Jul. 6, 2015

(65) Prior Publication Data

US 2017/0013086 A1  Jan. 12, 2017

(51) Int. Cl.
| | |
|---|---|
| *G06F 15/16* | (2006.01) |
| *H04L 29/08* | (2006.01) |
| *H04B 7/185* | (2006.01) |
| *H04L 12/24* | (2006.01) |
| *H04W 88/08* | (2009.01) |

(52) U.S. Cl.
CPC ......... *H04L 67/34* (2013.01); *H04B 7/18506* (2013.01); *H04L 41/22* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 4,512,745 A * | 4/1985 | Mohon | F41G 3/2694 348/123 |
| 6,319,008 B1 | 11/2001 | Mickelson et al. | |
| 6,671,589 B2 | 12/2003 | Holst et al. | |
| 7,356,336 B2 | 4/2008 | Perez et al. | |
| 2002/0111720 A1* | 8/2002 | Holst | G06F 8/61 701/3 |
| 2003/0003872 A1 | 1/2003 | Brinkley et al. | |
| 2003/0208579 A1* | 11/2003 | Brady, Jr. | G06F 8/65 709/223 |
| 2007/0027589 A1* | 2/2007 | Brinkley | H04B 7/18506 701/3 |

(Continued)

OTHER PUBLICATIONS

Joseph L. Reiser, U.S. Statutory Invention Registration No. H2040, published Aug. 6, 2002.

(Continued)

*Primary Examiner* — Mohamed Ibrahim
(74) *Attorney, Agent, or Firm* — McDonnell Boehnen Hulbert & Berghoff LLP

(57) ABSTRACT

Methods and systems for wirelessly loading software on at least one line replaceable unit (LRU) of a vehicle and wirelessly verifying the loading of the software are provided. An example method includes a computing device sending, via a wireless access point, instructions to a conversion module to configure the conversion module for loading software on at least one LRU. The method also includes the computing device transferring, via the wireless access point, the software to the at least one LRU. Further, the method includes the computing device connecting to a vehicle network of the vehicle using the wireless access point. Yet further, the method includes the computing device simulating output of a vehicle display unit of the vehicle based on data received from the vehicle network.

20 Claims, 5 Drawing Sheets

(56) References Cited

U.S. PATENT DOCUMENTS

2007/0262185 A1* 11/2007 Burke .................... H01R 13/72
                                                      242/370
2013/0063435 A1*  3/2013 Stannard ................ G01C 21/00
                                                      345/420

OTHER PUBLICATIONS

Onboard Loadable Software, AERO Magazine, Issue 05, Jan. 1999, available at http://www.boeing.com/commercial/aeromagazine/aero_05/textonly/ps02txt.html.
Evolution of Airborne Data Loaders, Avionics Magazine Tech Report, Sep. 21, 2006, available at http://www.teledynecontrols.com/productsolution/eADL/eADL%20Tech%20Report.pdf.

* cited by examiner

WIRELESS SOFTWARE LOADER

FIELD

The present disclosure relates generally to communication systems, and examples of such communication systems that facilitate loading and verification of software on modules of a vehicle. In further examples, methods and systems enabling wireless loading and verification of loadable software on a line replaceable unit (LRU) of a vehicle are provided.

BACKGROUND

Many vehicles, such as airplanes, ships, or spacecraft, make use of a large number of actuators, sensors, and other components. These components can sometimes be individually controlled to perform various functions. By way of example, modern day commercial and military aircraft typically include a number of components that are monitored and/or controlled by a module called an LRU. An LRU may incorporate one or more processors for controlling and/or monitoring one or more components or subassemblies of a vehicle (e.g., an aircraft). For instance, on an aircraft, an LRU may monitor and/or control one or more external devices such as an actuator, valve, motor, etc., associated with component or assembly of the aircraft. An LRU may also generate output signals which can be monitored to determine if the LRU and/or the component with which the LRU is associated is functioning properly. A few examples of some of the LRU's associated with a C-17 aircraft include an aerial delivery system controller, a sensor signal interface, an electronic engine control, a cabin pressure controller, a flight data recorder, a head-up display unit, a satellite data unit, and a flight control computer.

The term LRU reflects the notion that an LRU is able to be replaced quickly on a flight line, rather than while an aircraft is at a maintenance facility. This quality may help improve maintenance operations, since when an LRU fails, the failed LRU can be quickly replaced with a spare LRU, thereby restoring an aircraft to service while the failed LRU is sent for repair. In some instances, an LRU may also be compatible across multiple aircraft platforms, eliminating the need to maintain an inventory of multiple aircraft-specific LRUs.

Many airplane systems feature loadable LRUs whose functionality may be changed or updated by loading new software onto the LRU. This feature enables operators to modify system functionality by modifying software instead of modifying or upgrading hardware and can help reduce the total number of LRU spares maintained in inventory. In some instances, loading new software may provide the ability to meet new requirements, incorporate design improvements, and/or correct errors without physically modifying or replacing hardware components. Furthermore, an operator may be able to load new software during the time required to turn an airplane around for the next flight.

In practice, software can be transferred to an LRU using various types of equipment. By way of example, software can be loaded using a permanently installed onboard loader, a portable onboard loader, industry-available shop loaders, supplier-unique shop loaders, or supplier automated test equipment. These devices use a wired, physical connection with the LRU to load the software. Further, the equipment for loading software may vary across different types of LRUs.

SUMMARY

In one example, a system is provided that comprises a vehicle having at least one LRU, a wireless access point, a conversion module, a network bridge, and a computing device. The at least one LRU is configured to communicate with a vehicle network via at least one data bus. The conversion module is configured to link the wireless access point and the at least one LRU, and the conversion module is linked to the wireless access point via a first data cable and linked to the at least one LRU via a second data cable. The network bridge is configured to communicate data between the wireless access point and the vehicle network. The computing device is configured to carry out functions including loading software on the at least one LRU by communicating the software to the at least one LRU via the wireless access point and the conversion module, and simulating a vehicle display unit of the vehicle by connecting to the vehicle network via the wireless access point and the network bridge.

In another example, a method for wirelessly updating data is provided comprising a computing device sending, via a wireless access point, instructions to a conversion module to configure to the conversion module for loading software on at least one LRU of a vehicle. The method also includes the computing device transferring, via the wireless access point, the software to the at least one LRU. Further, the method includes the computing device connecting to a vehicle network of the vehicle using the wireless access point. Yet further, the method includes the computing device simulating output of a vehicle display unit of the vehicle based on data received from the vehicle network.

In still another example, a computing device comprising at least one processor and a computer-readable medium is provided. The computer-readable medium is configured to store instructions, that when executed by the at least one processor, cause the computing device to perform functions. The functions comprise sending, via a wireless access point, instructions to a conversion module to configure the conversion module for loading software to at least one LRU of a vehicle. The functions also include transferring, via the wireless access point, the software to the at least one LRU. Further, the functions include connecting to a vehicle network of the vehicle using the wireless access point. Yet further, the functions include simulating output of a vehicle display unit of the vehicle based on data received from the vehicle network.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

DETAILED DESCRIPTION

Figure 1:
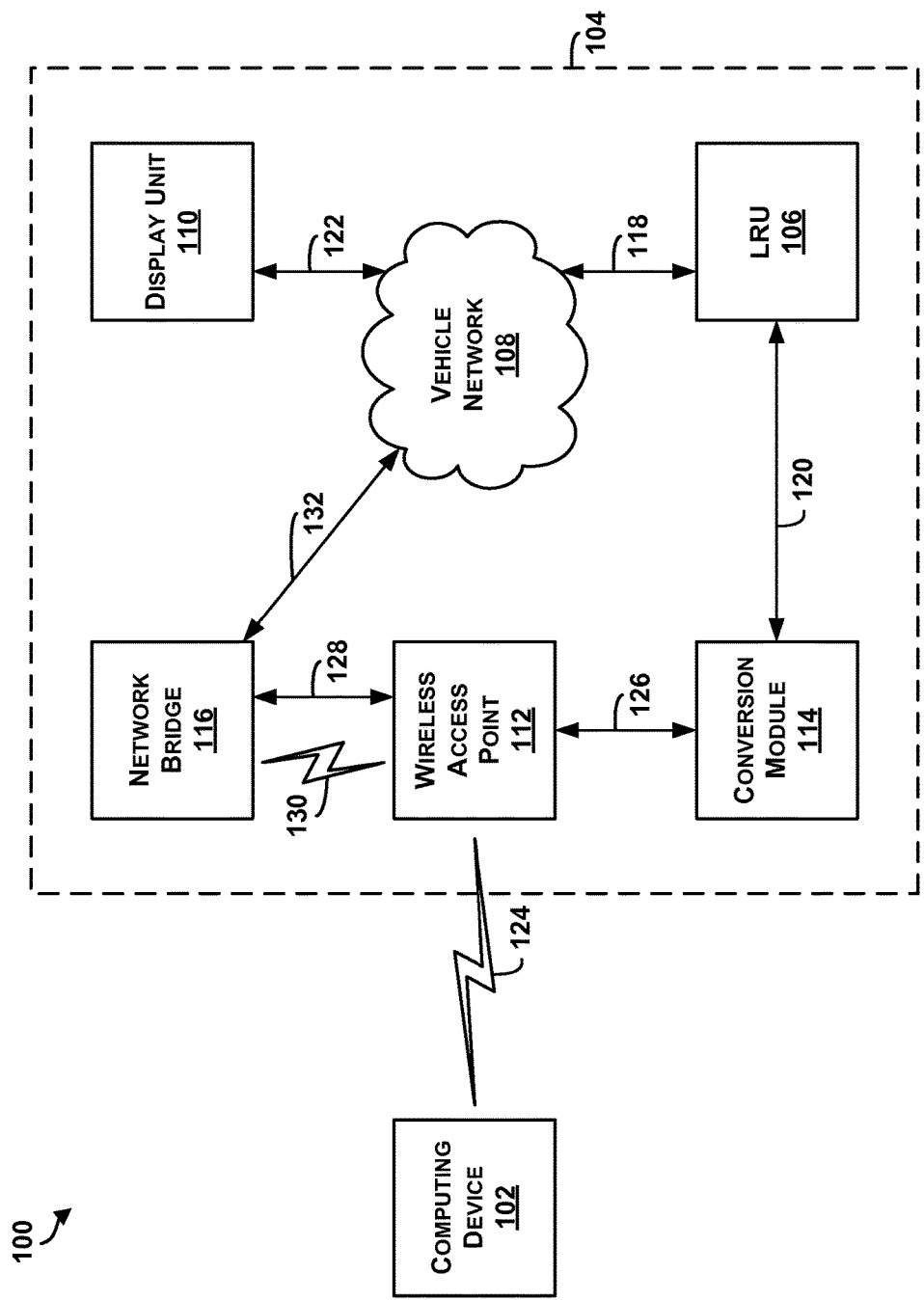
FIG. 1 is a block diagram of an example system according to an example embodiment.

Disclosed embodiments will now be described more fully hereinafter with reference to the accompanying figures, in which some, but not all of the disclosed embodiments are shown. Indeed, several different embodiments may be provided and the scope of this disclosure should not be construed as limited to the embodiments set forth herein. Rather, these embodiments are provided so that this disclosure will be thorough and complete and will fully convey the scope of the disclosure to those skilled in the art.

To help illustrate features of the present disclosure, portions of this disclosure focus on an aircraft or airplane system by way of example. Those of ordinary skill in the art will readily appreciate, however, that the disclosed principles can be applied as well in other types of vehicle systems having LRUs or similar modules, with variations where appropriate. For instance, the disclosed principles can be applied in other types of vehicles, such as ships, spacecraft, automobiles, or any other type of manufactured vehicle.

In the following examples, systems and methods for loading software on an LRU of a vehicle and verifying whether the software was loaded successfully are described. The systems and methods may facilitate loading the software wirelessly using a computing device that is located remotely from the vehicle and which wirelessly communicates with the vehicle using a wireless access point on the vehicle. Further, the systems and methods may also facilitate verifying whether the software was loaded properly by using the computing device to simulate operation of a vehicle display unit of the vehicle.

Advantageously, the described systems and methods may help streamline the process of loading and verification of software on an LRU. By way of example, ordinarily, loading software on an LRU of an aircraft may involve a user carrying a computer (e.g., a laptop) onto the aircraft, connecting the computer to the LRU, and downloading the software from the computer to the LRU. Further, to verify that the software was loaded on to the LRU, the user (or another user) may then interact with the aircraft. As an example, the user may read an output of a display unit in a cockpit of the aircraft to verify the software load. In a scenario in which the LRU is located outside of the cockpit, this process could involve two users: a first user at the location of the LRU, and a second user in the cockpit to read the display unit. An alternative process for loading and verifying the software may involve removing the LRU from the aircraft completely, loading software on to the LRU in a lab, verifying whether the software was properly installed in the lab, and then reinstalling the LRU on the aircraft. However, this process may be unnecessarily time consuming, as the process involves physically removing the LRU, transporting the LRU back-and-forth to a lab, and then physically reinstalling the LRU.

In accordance with embodiments described herein, a single user may use a single computing device to load software onto an LRU and also verify whether the software was loaded. In some instances, the loading and verifying may be performed in matter of minutes without requiring access to a cockpit of the aircraft. Furthermore, the systems and methods described herein may allow a single user to perform the loading and verification without removing the LRU from the aircraft. Thus, the systems and methods described herein may streamline the process of loading and verifying software onto LRUs, which may in turn help streamline the process of manufacturing or repairing an aircraft, for example.

Referring now to the figures, FIG. 1 is a block diagram showing an example system 100 for wirelessly loading software onto an LRU and for verifying installation of the software. As shown in FIG. 1, the system 100 includes a computing device 102 that wirelessly communicates with a vehicle 104. The computing device 102 may be any type of computing device (e.g., desktop computer, laptop computer, tablet computer, mobile phone, wearable computer, etc.). The vehicle 104 may be any type of manufactured device, such as a commercial or military aircraft, commercial or military watercraft, spacecraft, automobile, railed vehicle, etc. Further, the vehicle 104 in turn includes at least one LRU 106, a vehicle network 108, a display unit 110, a wireless access point 112, a conversion module 114, and a network bridge 116.

The LRU 106 may be any type of LRU configured to monitor and/or control one or more components or subassemblies of the vehicle 104. For instance, in an embodiment in which the vehicle 104 is an airplane, the LRU 106 may be an aerial delivery system controller, a sensor signal interface, an electronic engine control, a cabin pressure controller, a flight data recorder, a head-up display unit, a satellite data unit, or a flight control computer, among a variety of other types of LRUs. Additionally, the LRU 106 may be a loadable LRU whose functionality may be changed or updated by loading new software onto the LRU.

Various types of software may be loadable on the LRU 106, depending on the type of vehicle and type of LRU. Examples of software that may be loaded on an LRU of an airplane include, for instance: operational program software, an operational program configuration file, a database, and airline modifiable information. Operational program software may be software that acts on data contained in the operation program configuration file(s) of an LRU to define the function of the LRU. One example of operational program software is an operational flight program (OFP). Operational program configuration files are software that determine the LRU configuration and function by enabling or disabling optional features contained in the operational program software. A database may include a collection of data arranged for easy access and retrieval by the operating system of an LRU. For instance, the database may be a flight management computer (FMC) navigation database, a FMC model/engine database, a FMC performance defaults database, airborne communications addressing and reporting system database, etc. Finally, airline modifiable information may include data files that supply information to the operational program software of an LRU (e.g., to specify preferences for various functions).

The LRU 106 may be configured to communicate with the vehicle network 108 via a data bus 118. For instance, on an airplane, the vehicle network 108 may be an aircraft network, and the LRU 106 may be configured to communicate with the aircraft network via a MIL-STD-1553 data bus, an ARINC 429 data bus, an ARINC 653 data bus, or another military or ARINC data bus. Additionally, the LRU 106 may also be configured to communicate with the conversion module 114 via a data cable 120. In practice, the form of the data cable 120 may vary, depending on the type of LRU. As one example, the data cable 120 may be a multi-conductor cable, such as a twisted shielded pair cable. Other examples are also possible. In some instances, the data cable 120 may facilitate loading software onto the LRU 106 by transmitting data according to the MIL-STD-1553 protocol, ARINC 429 protocol, ARINC 653 protocol, or other military or ARINC protocol.

Vehicle network 108 may facilitate communication between various modules and components of the vehicle 104. In one instance, vehicle network 108 may be an aircraft network, such as a MIL-STD-1553 network, an ARINC 664 network, or an Avionics Full-Duplex Switched Ethernet (AFDX) data network, for example.

Display unit 110 may be configured to receive data pertaining to the vehicle 104 via vehicle network 108 and display text and/or graphics indicative of the received data. For instance, in an airplane, display unit 110 may take the form of a display unit of an electronic flight instrument system. In this scenario, the display unit 110 may be a primary flight display, multi-function display, or engine indications and crew alerting system/electronic centralized aircraft monitoring display. Additionally, display unit 110 may receive data from the vehicle network 108 via a data bus 122.

Wireless access point 112 may be a device that allows wireless devices to connect to a wired network using Wi-Fi or other related wireless standards. Wireless access point 112 may be configured to communicate with computing device 102 via wireless communication link 124. Additionally, wireless access point may be connected to conversion module 114 via data cable 126. In one example, data cable 126 may be an Ethernet cable. Alternatively, the data cable 126 may be another type of multi-conductor data cable configured to transmit data. Accordingly, wireless access point 112 may be configured to forward data received from the computing device 102 to the data conversion module 114.

Conversion module 114 may be configured to link the wireless access point 112 and the LRU 106. Specifically, conversion module 114 may be linked to the wireless access point 112 via data cable 126, and as discussed previously, LRU may be linked to the conversion module 114 via data cable 120. In some instances, each of the data cables 120, 126 may be multi-conductor cables. Further, in some examples, data cable 120 may have a different number of conductors than data cable 126. By way of example, data cable 126 may be an Ethernet cable having 2 pairs (4 wires) or 4 pairs (8 wires), and data cable 120 may have a different number of wires. Accordingly, conversion module 114 may function to selectively couple one or more conductors of data cable 126 with one or more conductors of data cable 120 to relay communication of Ethernet traffic received at the wireless access point to one or more specific conductors of the data cable 120. Conversion module 114 may also have one or more controllable switches that enable providing a high or low signal to one or more particular conductors of the data cable 120 to facilitate loading of software on the LRU.

Furthermore, wireless access point may be configured to communicate with network bridge 116 via a data cable 128 and/or wireless link 130. Network bridge 116 may, in turn, be configured to communicate data between the vehicle network 108 and the wireless access point 112. In one example, network bridge 116 may receive vehicle network traffic from the vehicle network 108 via a data cable 132, convert the data from vehicle network traffic to Ethernet traffic, and relay the data to the wireless access point 112. Similarly, the network bridge 116 may be configured, in some examples, to receive Ethernet traffic from the wireless access point 112, convert the Ethernet traffic to vehicle network traffic, and relay the vehicle network traffic to one or more entities on the vehicle network 108. As a particular example, the vehicle 104 may be an aircraft, and the network bridge 116 may convert between Ethernet traffic and aircraft network traffic (e.g., MIL-STD-1553 traffic or AFDX traffic).

The example system 100 is provided for purposes of example, and is not meant to be limiting. In other embodiments, the system 100 may include more or less components, depending on the type of vehicle, for instance.

Additionally, in an alternative arrangement, rather than computing device 102 communicating directly with the wireless access point 112, the system 100 may include an additional computing device (not shown) to which the computing device 102 is connected via a wired or wireless connection (e.g., the computing device 102 and the additional computing device may be connected via the Internet). In this scenario, the additional computing device may be located within a wireless communication range of the wireless access point 112, and the computing device 102 may be located outside of the wireless communication range of the wireless access point 112. Further, the computing device 102 may provide data to and receive data from the additional computing device, which in turn relays the data to or from the wireless access point 112 via a wireless communication link.

Figure 2:
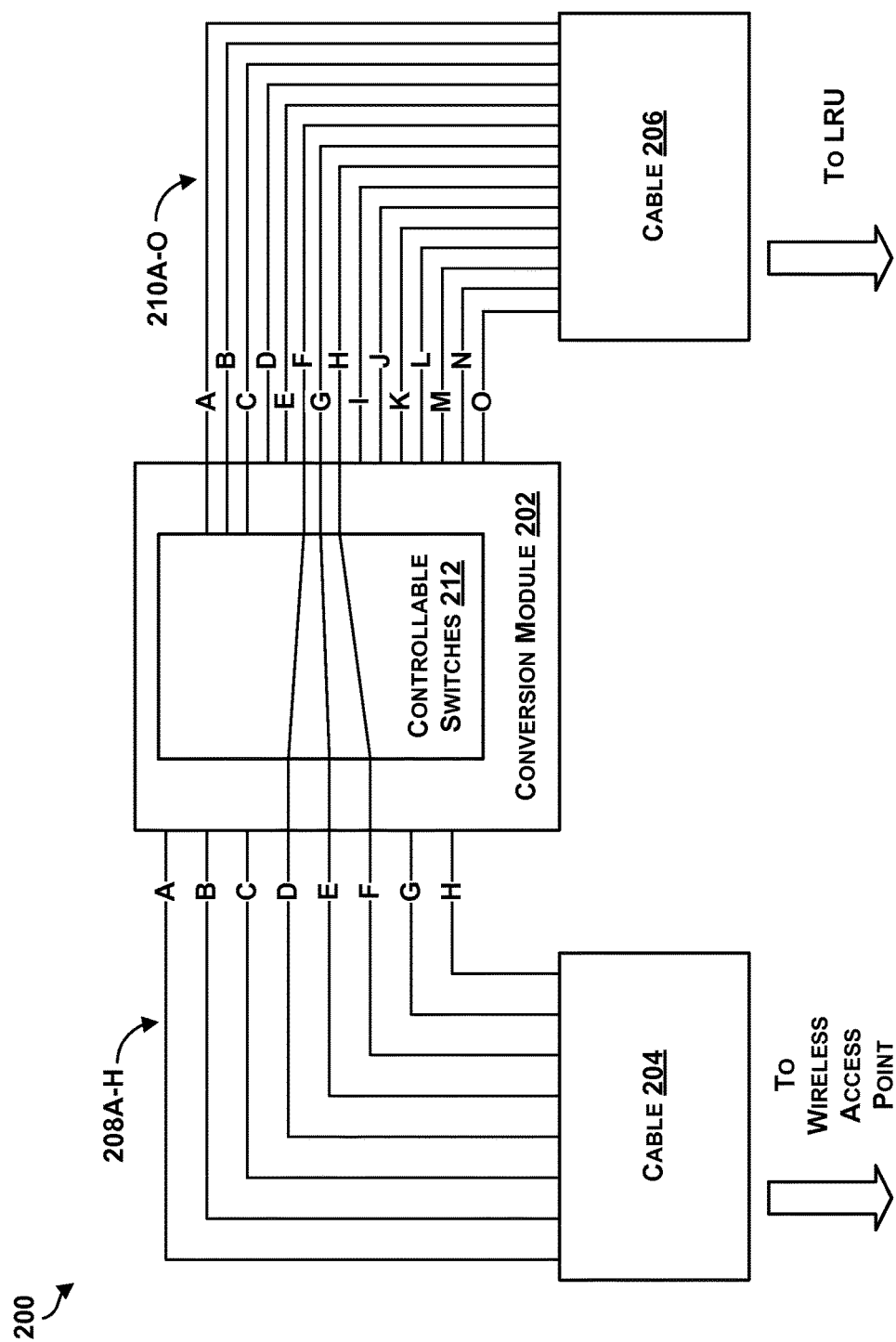
FIG. 2 is a schematic drawing of an example conversion module according to an example embodiment.

As discussed briefly above, conversion module 114 may be configured to link the wireless access point 112 and the LRU 106. FIG. 2 is a schematic drawing of an example conversion module 202 illustrating linking of a wireless access point and an LRU. As shown in FIG. 2, conversion module 202 may link a data cable 204 originating from a wireless access point to a data cable 206 originating from an LRU. In the example illustrated in FIG. 2, the data cable 204 includes a plurality of conductors 208A-H and the data cable 206 includes a plurality of conductors 210A-O. Note that the numbers of conductors illustrated in FIG. 2 are provided as examples and not meant to be limiting.

As further shown in FIG. 2, the conversion module 202 includes controllable switches 212, which may function to selectively couple one or more conductors of the data cable 204 with one or more conductors of the data cable 206. In practice, one or more of the conductors of the data cable 204 may be configured for transmitting data. Similarly, one or more of the conductors of data cable 206 may be configured for receiving data. Accordingly, the conversion module may function to link the conductors of data cable 204 that are configured for transmitting data with the conductors of the data cable 206 that are configured for receiving data. As an example, as shown in FIG. 2, controllable switches 212 couple conductors 208D-F to conductors 210E-H, respectively. Thus, if the wireless access point provides data in the form of software to the conversion module 202, the conversion module may relay the data to the LRU such that the software may be loaded on the LRU.

Additionally, as mentioned above, the controllable switches 212 may also function to provide a high or low signal to one or more particular conductors of the data cable 206 to facilitate loading of software on the LRU. In practice, loading software on to the LRU may involve setting one or more specific pins or conductors on/off for the loading process. To accomplish this, the controllable switches may be directed to provide a high or low signal to those specific conductors.

In one example, the wireless access point may relay instructions to the conversion module 202 for configuring the controllable switches 212, and the conversion module 202 may responsively operate the controllable switches 208 in accordance with the instructions. As illustrated in FIG. 2, for instance, the controllable switches 212 may be configured to provide a high or low signal to conductor 210A. Thus, to configure an LRU for loading software, a computing device, such as computing device 102 (see FIG. 1), may provide instructions to the conversion module 202 via the wireless access point, and the instructions may cause the controllable switches 212 to provide an appropriate signal to one or more conductors of the data cable 206. Subsequently, the computing device may then transfer software to the LRU via the wireless access point.

In some instances, the LRU may support Ethernet loading. In such a scenario, the computing device may transmit instructions to the conversion module 202 by specifying how to transmit data and what protocol(s) to use. For example, the computing device may instruct the conversion module 202 to send Ethernet data to the LRU using User Datagram Protocol (UDP) port 1000 with 100 bytes sent at a time. In another scenario, the computing device may provide instructions to the conversion module 202 by specifying that the conversion module 202 should transmit data on a 1553 bus on sub address 1 with 20 data words per transmission. Other examples are also possible.

Figure 3:
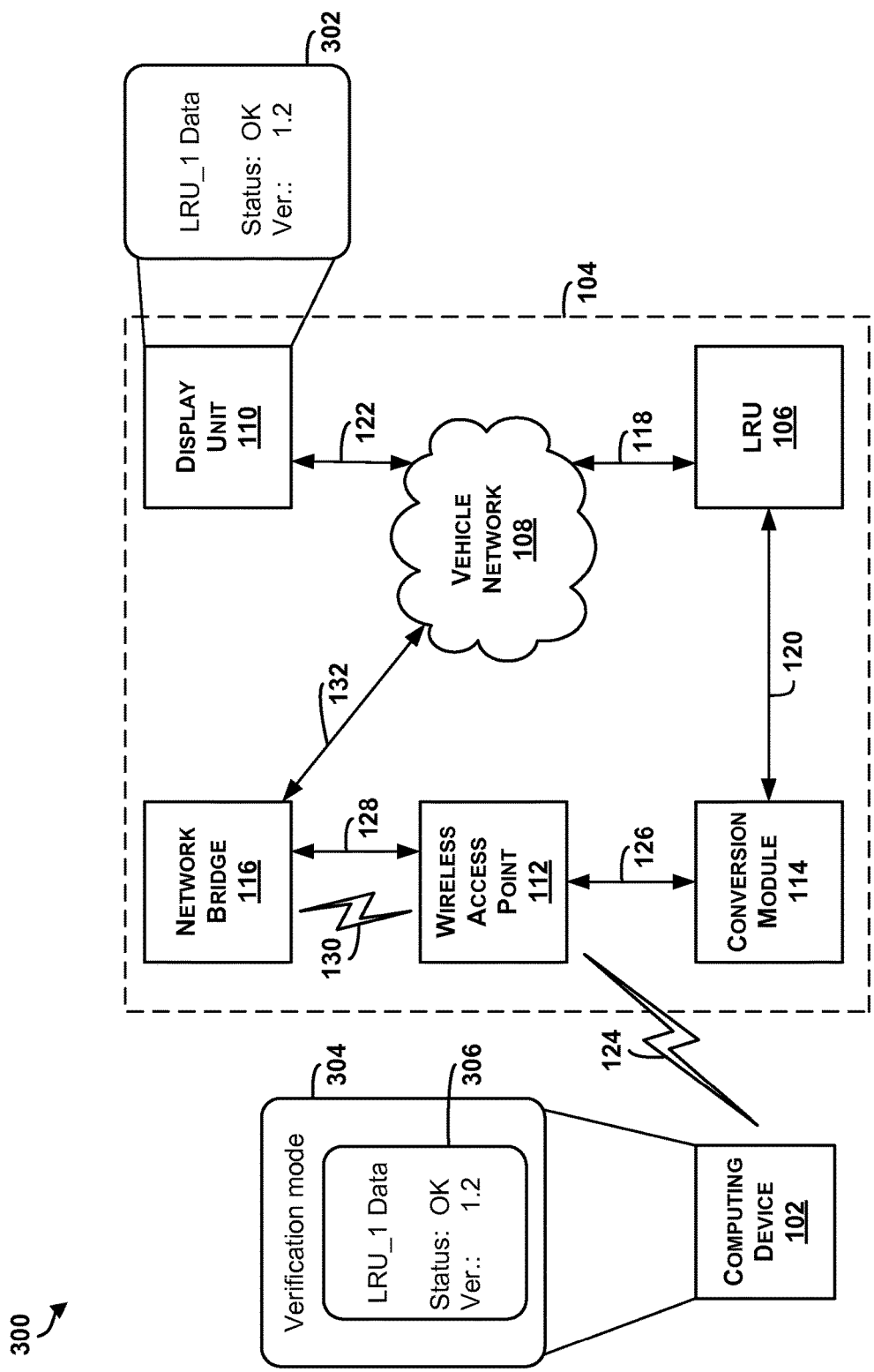
FIG. 3 is a conceptual illustration of simulating output of a vehicle display unit according to an example embodiment.

In line with the discussion above, the computing device that loads the software to the LRU may also function to verify the installation of the software. By way of example, the computing device may simulate output of a vehicle display unit of the vehicle that provides verification data related to the loading of the software. FIG. 3 is a conceptual illustration of simulating output of a vehicle display unit in the example system 100 described above (see FIG. 1).

As shown in FIG. 3, the display unit 110 may provide a display interface 302 that provides verification data related to the loading of the software. The display unit may receive this verification data from the LRU 106 via the vehicle network 108.

In one example, the display unit 110 may be a display unit in a cockpit of an aircraft, and a user may navigate to a particular screen or window in the display interface 302, using one or more buttons or input devices corresponding to the display unit 110, causing the display unit to display data onto the display interface 302. The display interface 302 may, for instance, include data identifying the LRU and a version number of the software loaded on the LRU.

In accordance with the present disclosure, rather than going to the cockpit of the aircraft to view the display unit 110, a user may verify the installation of the software on the LRU using the computing device 102. By way of example, the computing device 102 may simulate operation of the display unit 110 by communicating with the vehicle network 108. For instance, the computing device 102 may provide on a display 304 of the computing device a display interface 306 mirroring the display interface 302.

In one example, computing device 102 may send data to the vehicle network 108 via the wireless access point and network bridge 116 that causes the computing device 102 to appear to the vehicle network 108 as a display unit. Computing device 102 may then receive verification data from the vehicle network 108 via the network bridge 116 and wireless access point, and display the verification data on a display interface 306. In one instance, because the network bridge 116 is connected to the vehicle network 108, the network bridge 116 may be able to receive all of the data that the display unit 110 would be able to receive. Further, the computing device 102 may provide instructions to the network bridge 116 specifying which data the network bridge 116 should forward to the computing device 102. As one example, the computing device 102 may instruct the network bridge 116 to send any 1553 data on Remote Terminal (RT) 1 Sub Address (SA) 1. Upon receiving the requested data, the computing device 102 may then display the data on the display interface 306 of the display 304. Similarly, the computing device 102 may be able to send data back to the vehicle network 108 via the network bridge 116. Thus, a user can verify installation of the software on the LRU without interacting with the display unit 110 in the vehicle 104.

In some instances, during the verification of the installation of the software on the LRU, the display unit 110 may be powered off to avoid the presence of duplicate data. For instance, the display unit 110 may be powered off, preventing the display unit 110 from sending data to the vehicle network 108 that may interfere with similar data sent by the computing device 102 to the vehicle network 108. However, in other instances, the display unit 110 may be powered on during the verification of the installation of the software on the LRU.

Figure 4:
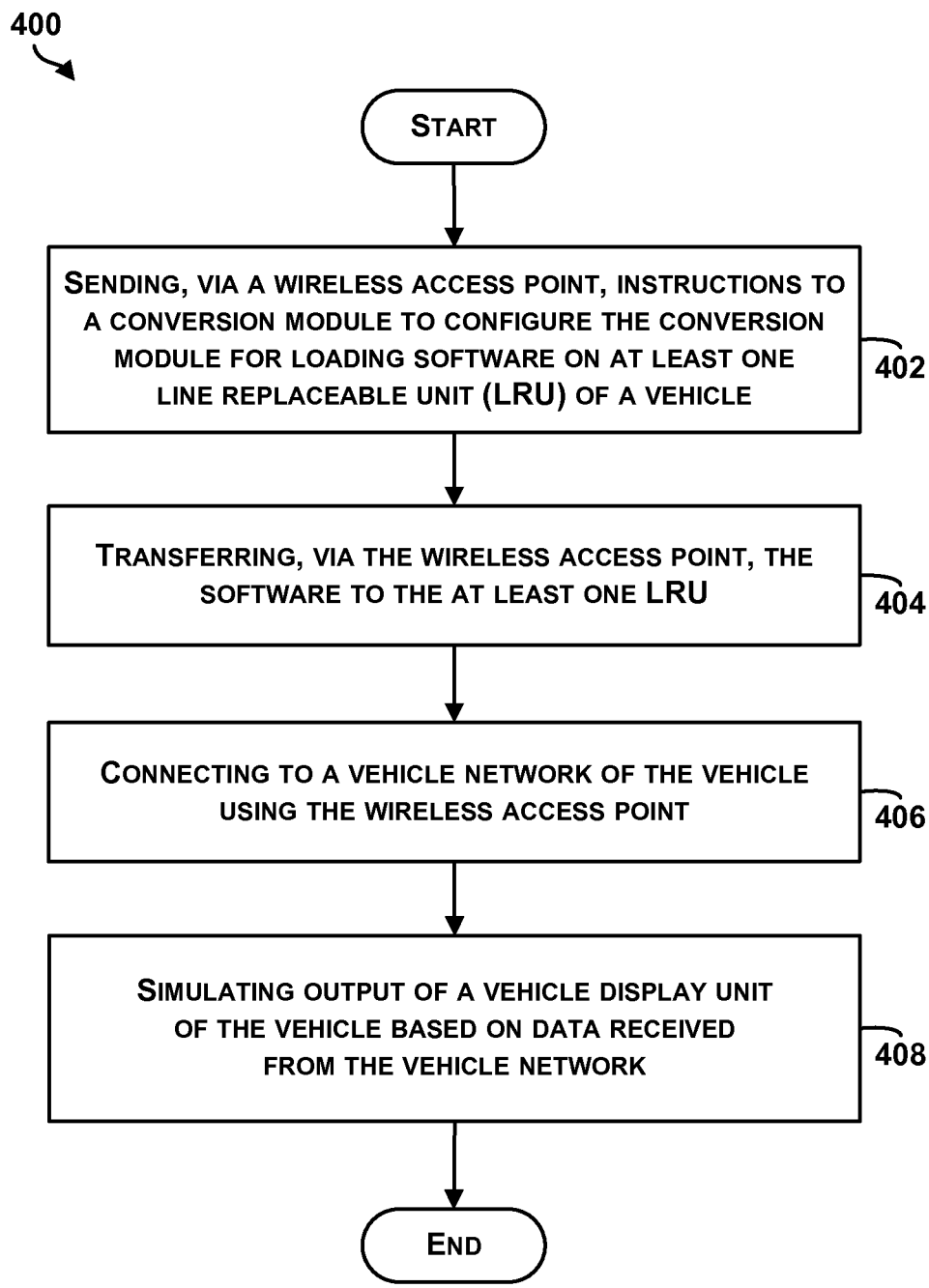
FIG. 4 is a flowchart of an example method for wirelessly updating data according to an example embodiment.

FIG. 4 is a flowchart of an example method 400 for wirelessly updating data. Method 400 shown in FIG. 4 presents an embodiment of a method that, for example, could be used with the system shown in FIG. 1, for example, and may be performed by a computing device (or components of a computing device) such as a client device or a server or may be performed by components of both a client device and a server. Example devices or systems may be used or configured to perform logical functions presented in FIG. 4. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems.

The computer readable medium may be considered a tangible computer readable storage medium, for example.

In addition, each block in FIG. 4 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those skilled in the art.

At block 402, the method 400 includes sending, via a wireless access point, instructions to a conversion module to configure the conversion module for loading software on at least one LRU of a vehicle. In line with the discussion above, a computing device may provide instructions to the conversion module by wirelessly communicating with the wireless access point, which in turn routes the instructions to the conversion module. Alternatively, the computing device may provide instructions to the conversion module by communicating the instructions to another computing device which relays the instructions to the wireless access point.

In one example, the vehicle may be an aircraft, and the computing device may be located remotely from the aircraft. In other words, in some instances, the computing device may carry out the functions of the method 400 without being located on the aircraft.

In one instance, the instructions may cause the conversion module to selectively couple individual conductors of a first data cable linking the wireless access point and the conversion module to one or more conductors of a second data cable linking the conversion module linking the conversion module and the LRU. Additionally or alternatively, the instructions may cause the conversion module to provide a signal to at least one particular conductor of the second data cable to enable loading of the software on the LRU. For instance, the instructions may cause a controllable switch to provide a high signal to the particular conductor or to multiple particular conductors of the second data cable.

In some embodiments, the computing device may provide a user interface through which a user may provide an input specifying an LRU identifier for the LRU. In response to receiving the input specifying the LRU identifier, the computing device may then determine, based on the LRU identifier, which particular conductors of the second data cable to switch on/off. For instance, the computing device may have a database storing data for a plurality of types of LRUs indicating which pins of the second data cable should be switched on/off to configure a respective type of LRU for loading software. And the computing device may perform a data lookup which is keyed to the LRU identifier to determine which conductors to switch on/off. Further, the computing device may then communicate instructions to the conversion module for effecting the switching on/off of the identified conductor(s).

At block 404, the method 400 includes transferring, via the wireless access point, the software to the least one LRU. In line with the discussion above, the computing device may transfer software stored on the computing device to the LRU. The software may include operational program software, an operational program configuration file, a database, and/or airline modifiable information, for instance. In one instance, a user may select a software file for delivery to the LRU via a user interface of the computing device, and responsive to receiving the selection, the computing device may send the software file to the LRU. For example, a user may select an operational flight program to be sent to the LRU, and the computing device may send the operational flight program to the LRU.

At block 406, the method 400 includes connecting to a vehicle network of the vehicle using the wireless access point. In line with the discussion above, the vehicle may include a network bridge configured to communicate data between the wireless access point and the vehicle network. Further, the network bridge may function to convert between Ethernet traffic and aircraft network traffic. Thus, the computing device may communicate data to the wireless access point, which in turn may route the data to the vehicle network via the network bridge. Similarly, the wireless access point may receive data from the vehicle network via the network bridge, and the wireless access point may route the data to the computing device.

In one example, because the network bridge is connected to the vehicle network, the network bridge may be able to receive all of the data that any other device connected to the vehicle network (e.g., a display unit) would be able to receive. Accordingly, to connect to the vehicle network, the computing device may provide instructions to the network bridge specifying which data the network bridge should forward to the computing device. And the network bridge may then responsively forward the requested data to the computing device via the wireless access point.

At block 408, the method 400 includes simulating output of a vehicle display unit of the vehicle based on data received from the vehicle network. In line with the discussion above, the computing device may provide on the computing device a display interface mirroring a display interface of the vehicle display unit. Further, the display interface may provide verification data related to the loading of the software. For instance, the computing device may receive verification data from the vehicle network, and provide the verification data for display on the computing device.

In some instances, a user may navigate through the display interface provided on the computing device, using an input device on the computing device, to view the verification data. For instance, if the computing device includes a touchscreen, the computing device may display the display interface on the touchscreen, and a user may use the touchscreen to navigate to a particular screen, menu, window, etc. that provides verification data related to the loading of the software.

In one example, a user may provide an input on the computing device specifying an LRU identifier, and the computing device may use the LRU identifier to configure the simulation of the display unit. For instance, based on the LRU identifier, the computing device may determine which of multiple possible display units to simulate, depending on which display unit provides verification data related to the LRU. In one example, the computing device may store a database correlating LRU identifiers and display units, and the computing device may perform a data lookup keyed to the LRU identifier to determine which display unit to simulate.

In some embodiments, the method 400 may further include physically connecting the LRU to the conversion module prior to sending the instructions to the conversion module for loading the software. For instance, a user may go to a location of the LRU on the vehicle and connect a data cable between the LRU and the conversion module.

Furthermore, in some examples, the method 400 may also include providing the wireless access point and the conversion module on the vehicle. For instance, the wireless access point may be portable unit that a user may bring to the vehicle for loading software on the vehicle. In such a scenario, the user may also plug a power cable for the wireless access point into a power source (e.g., a power source provided on the vehicle). Alternatively, the wireless access point and/or conversion module may be permanently mounted on or fixed to the vehicle.

Figure 5:
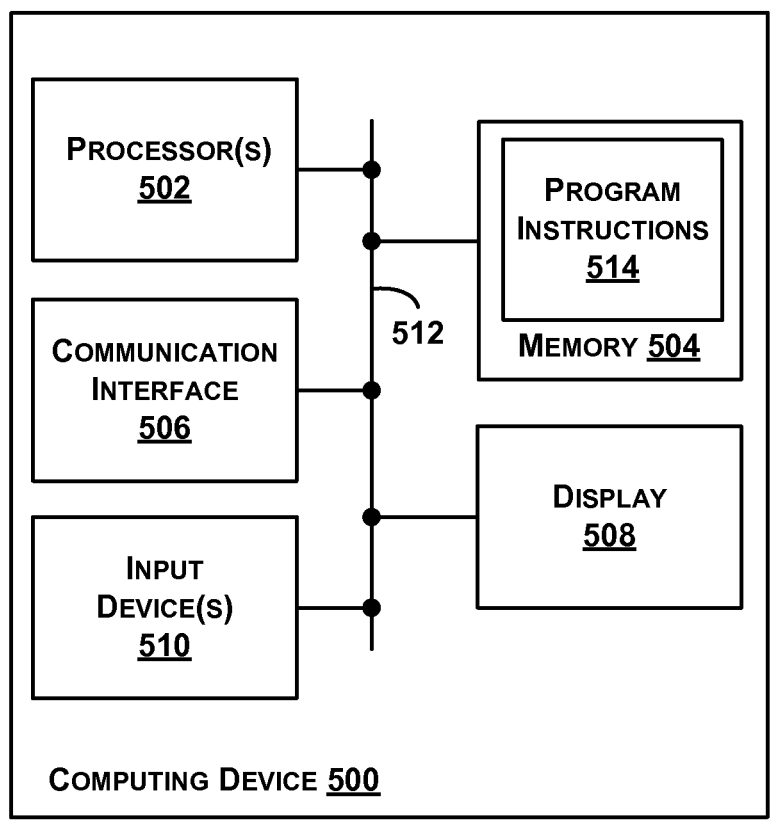
FIG. 5 is a schematic diagram of an example computing device according to an example embodiment.

As mentioned, portions of the method 400 may be performed by a computing device (or components of a computing device). FIG. 5 is a schematic diagram of an example computing device 500. The computing device 500 in FIG. 5 may represent the computing device 102 (see FIG. 1). In some examples, some components illustrated in FIG. 5 may be distributed across multiple computing devices. However, for the sake of example, the components are shown and described as part of one example device 500. The computing device 500 may be or include a mobile device, desktop computer, email/messaging device, tablet computer, or similar device that may be configured to perform the functions described herein.

As shown in FIG. 5, the computing device 500 may include one or more processors 502, a memory 504, a communication interface 506, a display 508, and one or more input devices 510. Components illustrated in FIG. 5 may be linked together by a system bus, network, or other connection mechanism 512. The computing device 500 may also include hardware to enable communication within the computing device 500 and between the computing device 500 and another computing device (not shown), such as a server entity. The hardware may include transmitters, receivers, and antennas, for example.

The one or more processors 502 may be any type of processor, such as a microprocessor, digital signal processor, multicore processor, etc., coupled to the memory 504. The memory 504 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the memory 504 may be configured to store program instructions 514. The program instructions 514 may be executable by the one or more processors 502. For instance, the program instructions 514 may cause the one or more processors 502 to provide a user interface for loading software and verifying whether the software is loaded. In one example, the program instructions 514 may cause the one or more processors 502 to send instructions to a conversion module to configure the conversion module for loading software on at least LRU of a vehicle, transfer software to the at least one LRU, connect to a vehicle network, and simulate output of a vehicle display unit of the vehicle based on data received from the vehicle network. The program instructions 514 may also be executable to cause the one or more processors 502 to perform other functions, such as any of the functions described herein.

The communication interface 506 may be configured to facilitate communication with one or more other devices, in accordance with one or more wired or wireless communication protocols. For example, the communication interface 506 may be configured to facilitate wireless data communication for the computing device 500 according to one or more wireless communication standards, such as one or more IEEE 802.11 standards, ZigBee standards, Bluetooth standards, etc. As another example, the communication interface 506 may be configured to facilitate wired data communication with one or more other computing devices, such as one or more cloud-connected computing devices or servers.

The display 508 may be any type of display component configured to display data. As one example, the display 508 may include a touchscreen display. As another example, the display may include a flat-panel display, such as a liquid-crystal display (LCD) or a light-emitting diode (LED) display.

The one or more input devices 510 may include one or more pieces of hardware equipment used to provide data and control signals to the computing device 500. For instance, the one or more input devices 510 may include a mouse or pointing device, a keyboard or keypad, a microphone, a touchpad, a touchscreen, or a camera, among other possible types of input devices.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for wirelessly updating data comprising:
a vehicle having at least one line replaceable unit (LRU), the at least one LRU configured to communicate with a vehicle network via at least one data bus;
a wireless access point;
a conversion module configured to link the wireless access point and the at least one LRU, wherein the conversion module is linked to the wireless access point via a first data cable and linked to the at least one LRU via a second data cable;
a network bridge configured to communicate data between the wireless access point and the vehicle network, wherein the network bridge is configured to convert vehicle network traffic to Ethernet traffic and relay the converted Ethernet traffic to the wireless access point; and
a computing device configured to carry out functions comprising: loading software on the at least one LRU by communicating the software to the at least one LRU via the wireless access point and the conversion module, and simulating a vehicle display unit of the vehicle by connecting to the vehicle network via the wireless access point and the network bridge, wherein simulating the vehicle display unit of the vehicle comprises: providing instructions to the network bridge specifying which data of the vehicle network traffic to forward to the computing device, and providing on the computing device a display interface mirroring a display interface of the vehicle display unit using the specified data of the vehicle network traffic.

2. The system of claim 1, wherein the first data cable comprises a first plurality of conductors and the second data cable comprises a second plurality of conductors, and wherein the conversion module is configured to selectively couple individual conductors of the first plurality of conductors with individual conductors of the second plurality of conductors.

3. The system of claim 2, wherein the conversion module is further configured to provide a signal to at least one particular conductor of the second plurality of conductors of the second data cable to enable loading of the software on the at least one LRU.

4. The system of claim 3, wherein the computing device is configured to cause the conversion module to provide the signal to the at least one particular conductor prior to the computing device loading the software on the at least one LRU.

5. The system of claim 4, wherein the computing device is further configured to:
receive an input specifying an LRU identifier for the at least one LRU, and
determine the at least one particular conductor based on the LRU identifier.

6. The system of claim 2, wherein the first data cable comprises an Ethernet cable and the second data cable comprises a multi-conductor cable having a different number of conductors than the Ethernet cable.

7. The system of claim 1, wherein the vehicle comprises an aircraft, and wherein the vehicle network comprises an aircraft network.

8. The system of claim 7, wherein the software comprises an operational flight program.

9. The system of claim 1, wherein the specified data comprises verification data related to the loading of the software.

10. The system of claim 9, wherein the computing device is further configured to:
receive an input specifying an LRU identifier for the at least one LRU, and
configure the simulation of the vehicle display unit based at least on the LRU identifier, wherein configuring the simulation based at least on the LRU identifier comprises determining, based on the LRU identifier, that the vehicle display unit provides the verification data.

11. A method for wirelessly updating data comprising:
a computing device sending, via a wireless access point, instructions to a conversion module to configure the conversion module for loading software on at least one line replaceable unit (LRU) of a vehicle;
the computing device transferring, via the wireless access point, the software to the at least one LRU;
the computing device connecting to a vehicle network of the vehicle using the wireless access point and a network bridge, wherein the network bridge is configured to convert vehicle network traffic to Ethernet traffic and relay the converted Ethernet traffic to the wireless access point; and
the computing device simulating output of a vehicle display unit of the vehicle based on data received from the vehicle network, wherein simulating output of the vehicle display unit comprises: providing instructions to the network bridge specifying which data of the vehicle network traffic to forward to the computing device, and providing on the computing device a display interface mirroring a display interface of the vehicle display unit using the specified data of the vehicle network traffic.

12. The method of claim 11, wherein the conversion module is linked to the wireless access point via a first data cable and linked to the at least one LRU via a second data cable having multiple conductors, and wherein the instructions for loading the software comprise instructions for providing a signal to at least one particular conductor of the second data cable to enable loading of the software on the at least one LRU.

13. The method of claim 12, further comprising physically connecting the at least one LRU to the conversion module prior to sending the instructions to the conversion module.

14. The method of claim 11, wherein the vehicle comprises an aircraft, wherein the wireless access point is located at the aircraft, and wherein the computing device is located remotely from the aircraft.

15. The method of claim 11, wherein specified data comprises verification data related to the loading of the software.

16. The method of claim 11, wherein the specified data comprises verification data related to the loading of the software, and wherein the method further comprises:
the computing device receiving an input specifying an LRU identifier for the at least one LRU, and
the computing device configuring the simulation of the vehicle display unit based at least on the LRU identifier, wherein configuring the simulation based at least on the LRU identifier comprises determining, based on the LRU identifier, that the vehicle display unit provides the verification data.

17. A computing device comprising:
at least one processor; and
a computer-readable medium, configured to store instructions, that when executed by the at least one processor, cause the computing device to perform functions comprising:
sending, via a wireless access point, instructions to a conversion module to configure the conversion module for loading software on at least one line replaceable unit (LRU) of a vehicle;
transferring, via the wireless access point, the software to the at least one LRU;
connecting to a vehicle network of the vehicle using the wireless access point and a network bridge, wherein the network bridge is configured to convert vehicle network traffic to Ethernet traffic and relay the converted Ethernet traffic to the wireless access point; and
simulating output of a vehicle display unit of the vehicle based on data received from the vehicle network, wherein simulating output of the vehicle display unit comprises: providing instructions to the network bridge specifying which data of the vehicle network to forward to the computing device, and providing on the computing device a display interface mirroring a display interface of the vehicle display unit using the specified data of the vehicle network traffic.

18. The computing device of claim 17, wherein the conversion module is linked to the wireless access point via a first data cable and linked to the at least one LRU via a second data cable having multiple conductors, and wherein the instructions for loading the software comprise instructions for providing a signal to at least one particular conductor of the second data cable to enable loading of the software on the at least one LRU.

19. The computing device of claim 17, wherein the specified data comprises verification data related to the loading of the software.

20. The system of claim 17, wherein the vehicle comprises an aircraft, and wherein the vehicle network comprises an aircraft network.

* * * * *